US007225337B2

(12) United States Patent
Baessler

(10) Patent No.: US 7,225,337 B2
(45) Date of Patent: May 29, 2007

(54) CRYPTOGRAPHIC SECURITY METHOD AND ELECTRONIC DEVICES SUITABLE THEREFOR

(75) Inventor: Felix Baessler, Bern (CH)

(73) Assignee: Swisscom Mobile AG, Bern (CH)

( * ) Notice: Subject to any disclaimer, the term of this patent is extended or adjusted under 35 U.S.C. 154(b) by 790 days.

(21) Appl. No.: 10/443,783

(22) Filed: May 23, 2003

(65) Prior Publication Data
US 2003/0221104 A1 Nov. 27, 2003

(30) Foreign Application Priority Data
May 24, 2002 (EP) .................................. 02405418

(51) Int. Cl.
*H04L 9/32* (2006.01)
(52) U.S. Cl. ...................... 713/175; 713/156; 713/157; 713/158; 713/176; 380/29; 380/278
(58) Field of Classification Search ................ 713/175, 713/176, 156–158
See application file for complete search history.

(56) References Cited

U.S. PATENT DOCUMENTS 5,721,781 A * 2/1998 Deo et al. ...................... 705/67
6,948,069 B1 * 9/2005 Teppler ...................... 713/178

2003/0005317 A1 * 1/2003 Audebert et al. ........... 713/193
2003/0135731 A1 * 7/2003 Barkan et al. .............. 713/155

FOREIGN PATENT DOCUMENTS

| EP | 0 892 521 | 1/1999 |
| WO | WO 01/26400 | 4/2001 |
| WO | WO 01/49054 | 7/2001 |

OTHER PUBLICATIONS

A. Levi, et al., Proceedings of BAS'98, The Third Symposium on Computer Networks, pp. 1-10, XP-002210349, "A Multiple Signature Based Certificate Verification Scheme", Jun. 25-26, 1998.

* cited by examiner

*Primary Examiner*—Kim Vu
*Assistant Examiner*—April Y. Shan
(74) *Attorney, Agent, or Firm*—Oblon, Spivak, McClelland, Maier & Neustadt, P.C.

(57) ABSTRACT

A portable electronic security module including an electronic data storage device, a secret private customer key and a public customer key stored in the electronic data storage device as a first digital key pair, a signature module configured to generate a digital customer signature from object data to be signed using the secret private customer key, a secret private key of a security provider and a public key of the security provider stored in the electronic data storage device as a second digital key pair, and a certification module, installed in the signature module, and configured to generate a digital signature certificate from the digital customer signature using the secret private key of the security provider.

24 Claims, 2 Drawing Sheets

CRYPTOGRAPHIC SECURITY METHOD AND ELECTRONIC DEVICES SUITABLE THEREFOR

This invention relates to a cryptographic security method as well as to electronic devices suitable therefor, in particular portable electronic security modules. The invention relates in particular to a cryptographic security method and electronic devices suitable therefor in which a secret private customer key is stored of a digital key pair, consisting of the secret private customer key and a public customer key, and in which, using the private customer key, a digital customer signature is generated from object data to be signed.

BACKGROUND ART

The generation of digital signatures or electronic signatures, as they are also called, by means of cryptographic methods is generally known. Conventionally, by means of a hash function, a characteristics record, a so-called fingerprint, is obtained from the object data to be signed. The object data are, for example, a digital data or text file. The fingerprint is the part of the object data which is used for generation of the digital signature. The digital signature is obtained from the fingerprint by means of an asymmetrical encryption method. Asymmetrical encryption methods are characterized in that different digital keys are used in each case for the encryption and the decryption: a public key and a secret private key. The digital signature of the object data to be signed is generated through the encryption of the fingerprint using the private key of the signatory.

Certificates for public keys, so-called public key certificates, are used to secure and control the association of a public key with the identity of a (legal) entity. A public key certificate is generated by the public key of the key holder, together with an identification of this key holder, being electronically signed by a security provider, a so-called certificate authority. That means that a fingerprint is generated from the public key and the identification, and the fingerprint is encrypted using the private key of the security provider. For verification of digital signatures, certificate directories, accessible to the public, with public key certificates are provided by the security provider. Revocation lists with revoked certificates are also mentioned in these directories. The costs for this infrastructure (Public Key Infrastructure, PKI) maintained by the security provider are typically billed to the key holders, i.e. the clients of the security provider.

In known applications, the digital key pair, a signature module for generating a digital signature using the private key, and, optionally, a certificate for the public key are stored, or respectively implemented, on portable electronic security modules. For increased security, the private key is often generated directly in the security module and never needs to leave it. Such security modules, which are implemented, as a rule, as chipcards, only have to be connected then to an electronic device, for instance a communication terminal, by their users when object data are to be provided with a digital signature during a transaction. The object data can then be transmitted to a receiver together with the digital signature and, optionally, with the certificate for the public key. The receiver must first of all check the public key certificate and determine the identity of the sender, and then verify the signature, i.e. the correctness of the signature. If no certificate for the public key has been affixed to the object data, the receiver must in addition obtain this certificate from a certificate directory, and, as a precaution, consult the revocation lists. When the identity of the sender and the correctness of the digital signature have been established, additional transaction-specific attributes of the sender must be requested and checked before the respective transaction can be processed. Examples of such sender-specific attributes include finance-technical data such as mode of payment, bank account, credit card number, credit limits or credit worthiness, validity data such as expiration date, date of updating, or period of validity, further identification data such as customer number, membership number, employee number or identification number or authorization data such as tickets, subscriptions or other access and user rights.

The above-described known security mechanisms and security modules have various drawbacks. For example, the infrastructure for the public certificates (PKI) is rather intricate, and the customers are often not willing to bear the ongoing costs arising therefrom. Moreover transactions using these known security mechanisms and security modules often turn out to be complicated as well since additional steps and data transfers between a plurality of communication partners are necessary for obtaining the public certificate and for checking the transaction-specific attributes of the sender. Finally, the certificates for the public key have a static nature since they are typically generated once, and are then used over a longer period of time, for instance over several years, which increases the risk of abuse by unauthorized third parties.

DISCLOSURE OF INVENTION

It is an object of the present invention to propose a new cryptographic security method as well as electronic devices suitable therefor which do not have the drawbacks of the state of the art.

In the security method and in the electronic devices suitable therefor, a secret private customer key is stored of a first digital key pair, consisting of the secret private customer key and a public customer key, and using the private customer key a digital customer signature is generated from object data to be signed.

One skilled in the art will understand that in each of the electronic devices several such secret private keys can be stored and that one of them can be selected by the customer in each case for the processes described in the following.

The above-mentioned objects are achieved through the present invention in particular in that stored in the electronic device is a secret private key of a second digital key pair consisting of the secret private key of a security provider and a public key of the security provider, and in that using the private key of the security provider a digital signature certificate is generated in the electronic device from the customer signature, preferably from a fingerprint, in particular from a hash, of the customer signature. The providing of the signature certificate, which is generated through electronic signing of the customer signature using the private key of the security provider, has the advantage that the customer signature can thereby be certified by the security provider without the infrastructure of the security provider having to be availed of for generating the signature certificate and without additional requests for data from certificate directories regarding the signature certificate being necessary. As long as the customer signature and the signature certificate are generated immediately one after the other by means of an inseparable process, it is ensured that the correct customer signature is certified using the private key of the security provider. The dynamic generation of the signature certificate has moreover the advantage that it is always generated anew and that security is thereby increased, for example compared with a static public key certificate.

In an embodiment variant, the public customer key is authenticated in the electronic device before generation of the digital signature certificate, and the customer signature is verified using the authenticated public customer key and the object data used for generation of the customer signature, for example the hash of the object data. The authentication of the public key and the verification of the customer signature before generation of the digital signature certificate have the advantage that the customer signature and the signature certificate are able to be generated through processes separate from one another without the security being compromised. Embodiment variants are thereby possible in which the customer signature and the signature certificate are generated through processes in two different physical units, for instance in different electronic security modules, such as chipcards, which are connected to each other via communication connections in an electronic device.

A customer identification is preferably stored in the electronic device, and the customer identification is used in addition in generating the signature certificate. Through the generation of the signature certificate from a fingerprint of the customer signature and the customer identification, a certified connection of the identity of the customer to the customer signature can be ensured without the infrastructure of the security provider having to be availed of.

Personal customer attributes are preferably stored in the electronic device, and the customer attributes are used in addition in generating the signature certificate. Through the generation of the signature certificate from a fingerprint of the customer signature and the customer attributes, a certified connection of the customer attributes to the customer signature can be ensured without the infrastructure of the security provider having to be availed of. In addition, the certified customer attributes can be transmitted directly to the receiver together with the customer signature, the signature certificate and the object data, so that further steps and data transmissions for determining and transmitting these customer attributes become superfluous.

Attribute updating instructions are preferably received in the electronic device, and the customer attributes are updated based on received attribute updating instructions. Thus by connecting the electronic device to a data terminal or to a communication module, the customer attributes can be constantly updated locally in a service center, or respectively in a remote-controlled way via a communication network.

In an embodiment variant, current time data are determined in the electronic device, and the determined time data are used in addition in generating the signature certificate. Through the generation of the signature certificate from a fingerprint of the customer signature and the current time data, a certified connection of the current time data about the point in time of generation of the customer signature to the customer signature can be ensured. This has the advantage that it can be ensured that the customer signature has been generated anew and currently and is not just an old copy. Moreover a certified transaction time can be recorded.

In an embodiment variant, the fingerprint of the object data to be signed is used in addition in generating the signature certificate, this fingerprint being used for generating the digital customer signature. Preferably, in generating the signature certificate, a further fingerprint is generated from the data (the certificate data) to be used for generating the signature certificate; a digital certificate signature is generated from the generated further fingerprint using the private key of the security provider, and the signature certificate is formed from the generated certificate signature and the generated further fingerprint. Through the generation of the signature certificate from a fingerprint of the certificate data to be used for the generation of the signature certificate, in particular the fingerprint of the customer signature, the customer identification, the customer attributes, the current time data and the fingerprint of the object data to be signed, a certified connection of these data to the customer signature can be ensured.

Preferably, key administration instructions are received in the electronic device, and the keys stored in the electronic device are activated, deactivated or updated based on received key administration instructions. Through connection of the electronic device to a data terminal or a communication module, the stored keys can thus be administrated locally in a service center of the security provider or respectively by the security provider via a communication network, preferably in a remote-controlled way. The digital keys can thereby be changed periodically or as needed, or individually disabled, whereby the security is increased.

The electronic devices suitable for the present cryptographic security method also comprise in particular portable electronic security modules, for example chipcards.

BRIEF DESCRIPTION OF DRAWINGS

An embodiment of the present invention will be described in the following with reference to an example. The example of the embodiment is illustrated by the following attached figures.

BEST MODES FOR CARRYING OUT THE INVENTION

Figure 1:
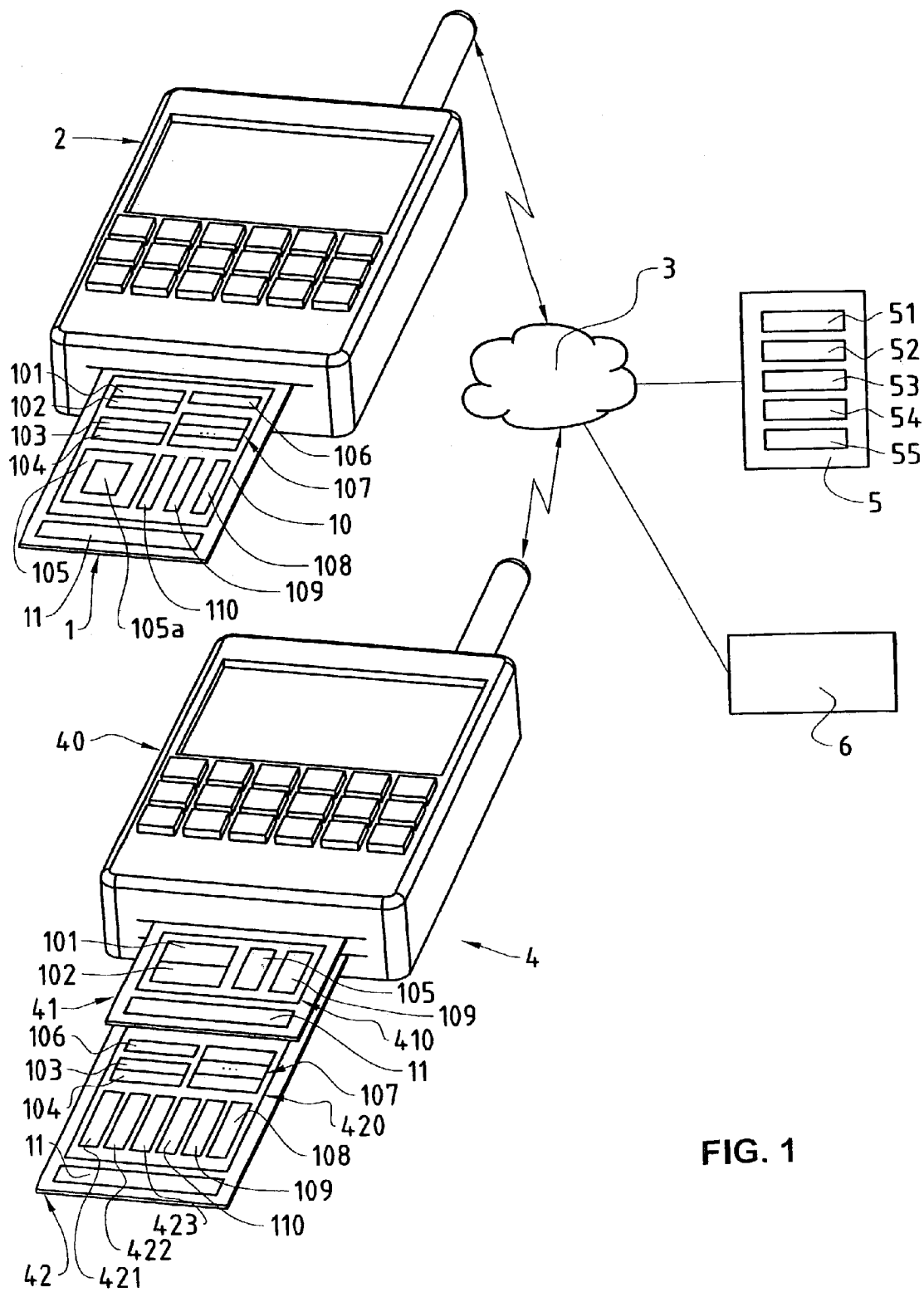
FIG. 1 shows a block diagram, representing schematically a portable electronic security module connected to a communication terminal and a further electronic device with a first and a second electronic security module, which are connectible, via a communication network, to a central unit of a security provider and to a terminal of a transaction partner.
Figure 2:
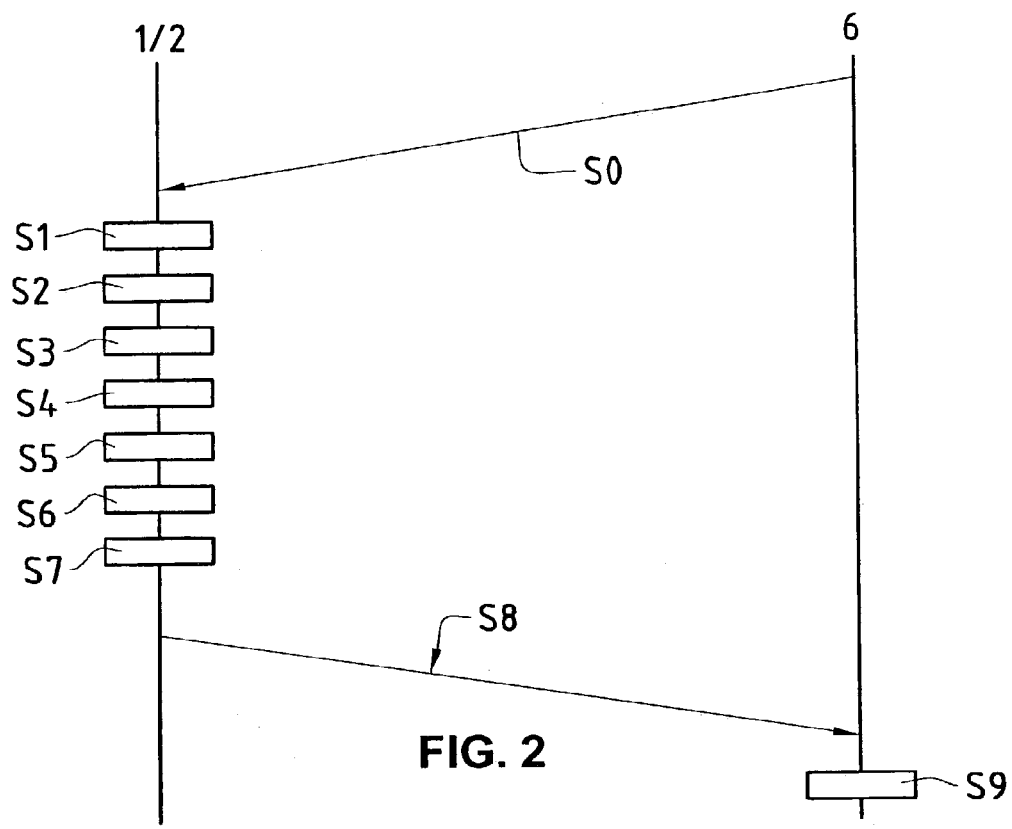
FIG. 2 shows a time-dependency diagram illustrating schematically the course of the method using the example of an ordering transaction for the case in which the customer signature and the signature certificate are generated in a security module by a inseparable process.
Figure 3:
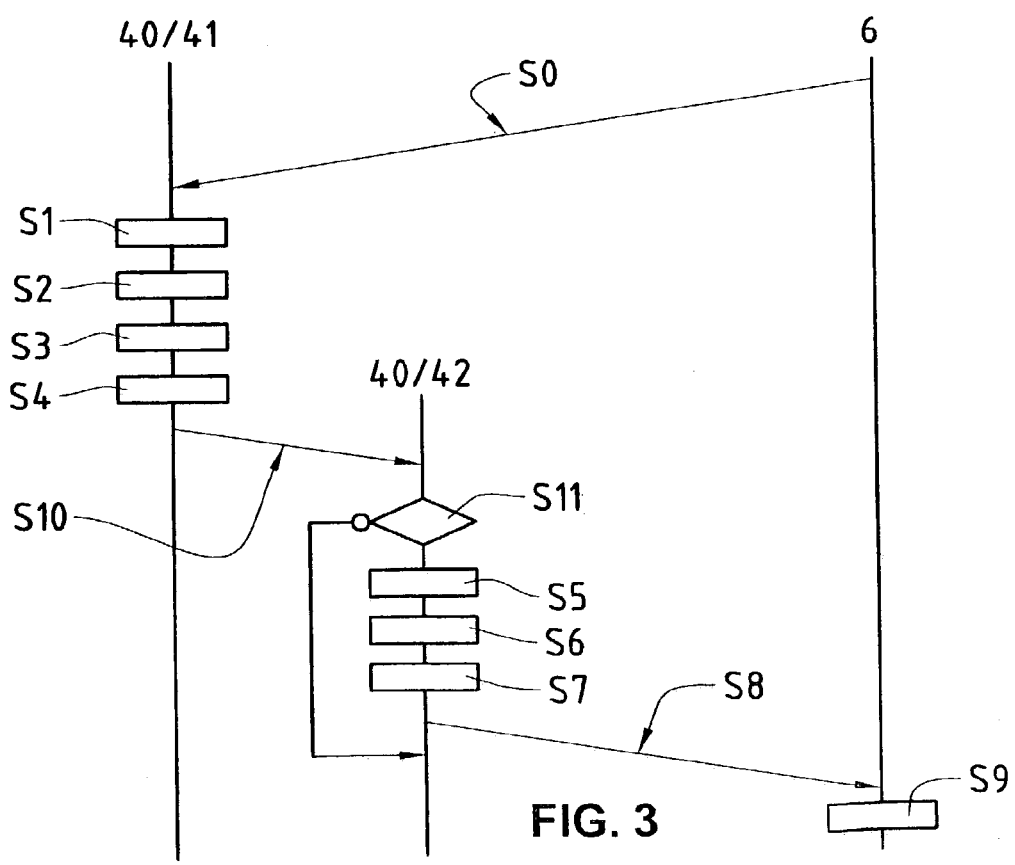
FIG. 3 shows a time-dependency diagram illustrating schematically the course of the method using the example of an ordering transaction for the case in which the customer signature and the signature certificate are generated in two different security modules through separate processes.

In FIGS. 1, 2 and 3 same components corresponding to one another are designated by the same reference numerals.

Designated as the customer in the following is the owner and user of the subsequently described security module. The security provider in the following is identical to the certificate authority described in the introduction.

In FIG. 1, the reference numeral 2 refers to a communication terminal connectible to the communication network 3. The communication network 3 comprises a mobile radio network and/or a fixed network. The mobile radio network is, for example, a GSM (Global System for Mobile Communication) or a UMTS network (Universal Mobile Telephone System) or another, e.g. satellite-based, mobile radio network. The fixed network is, for instance, the public switched telephone network, an ISDN (Integrated Services Digital Network) or the Internet. Accordingly, the communication terminal 2 is a mobile radio telephone or a laptop or PDA (Personal Digital Assistant) computer with a communication module for communication over a mobile radio network, or a communication terminal with a communication module for communication over a fixed network, for instance a PC (Personal Computer).

In FIG. 1, the reference numeral 1 refers to a portable electronic security module which is removably connected to the communication terminal 2. The security module 1 is connected to the communication terminal 2 via a contactless interface or an interface having contacts. The security module 1 comprises at least one processor 11 and an electronic data store 10 for storing digital data and software programs. The security module 1 is preferably implemented as a chipcard, for example a SIM (Subscriber Identity Module) card.

Stored in the electronic data store 10 are a first digital key pair, composed of a public customer key 101 and a secret private customer key 102, and a second digital key pair, composed of a public key 103 of the security provider and a secret private key 104 of the security provider. Also, in an embodiment variant, just the secret private customer key 102 and the secret private key 104 of the security provider can be stored in the data store 10, and the public customer key as well as the public key of the security provider can be filed on a server in a way accessible to the public. Stored in the data store 10 is also a customer identification 106, for example an IMSI (International Mobile Subscriber Identity) or another subscriber or user identification. To preserve the anonymity of the customer vis-à-vis transaction partners (other service providers), the customer identification is preferably a customer number (or a customer code) administered by the security provider, to which the identity of the respective customer can only be assigned by the security provider. Stored furthermore in the data store 10 are also personal customer attributes 107, which comprise, for instance, financial technical data such as mode of payment, bank account, credit card number, credit limit or credit worthiness, validity data such as expiration date, date of updating, or period of validity, further identification data such as customer numbers or membership numbers in the case of transaction partners, employee number or identification number, or authorization data such as tickets, subscriptions or other access and user rights.

The security module 1 also comprises functional modules 105, 108, 109 and 110, which are implemented preferably as programmed software modules for control of the processor 11 and are stored in the data store 10. One skilled in the art will understand that the functional modules 105, 108, 109 and 110 can also be implemented partially or completely through hardware. The functional modules 105, 108, 109 and 110 comprise a signature module 105, an attribute updating module 108, a time determining module 109 and a key administration module 110.

The time determining module 109 determines current time data comprising the current date and the time of day. The time determining module 109 is implemented completely in the security module 1, and comprises a clock generator and a setting register. The time determining module 109 can also be implemented purely as a programmed software module which obtains the time data from the communication terminal 2 via the interface.

The signature module 105 comprises cryptographic functions in order to generate a digital customer signature, based on an asymmetrical encryption method (e.g. Rivest-Shamir-Adleman Encryption, RSA), from object data to be signed, using the private customer key 102. The object data to be signed are digital data, for example a digital text or data file, which are received from the communication terminal 2 via the above-mentioned interface. The signature module 105 generates first a fingerprint (e.g. a so-called hash) of the object data to be signed (e.g. with a SHA1 hash function), and out of that the digital customer signature using the private customer key 102. As an alternative, the signature module 105 can also receive the fingerprint of the object data to be signed from another module. The signature module 105 stores moreover the current time data, determined by the time determining module 109, for the generated customer signature.

In FIG. 1, the reference numeral 5 designates a central unit 5 of the security provider. The central unit 5 comprises at least one computer connected to the communication network 3. As shown schematically in FIG. 1, the central unit 5 comprises programmed software functions, i.e. key administration functions 51 for distributing and updating digital keys of the security provider in the security modules 1, 41, 42 connectible to the communication network 3 and for activating newly generated customer keys in the security modules 1, 41, 42, key disabling functions 52 for deactivating keys in the security modules 1, 41, 42 of blocked customers, attribute administration functions 53 for updating, adding and deleting customer attributes in the security modules 1, 41, 42, archive functions 54 for storing and making available public key certificates for the public customer keys in the central unit 5, and verification functions 55 for verifying customer signatures in cases of dispute.

The attribute updating module 108 receives, via the above-mentioned interface, attribute updating instructions which are received in the communication terminal 2 via the communication network 3 from the central unit 5 of the security provider. The attribute updating module 108 preferably comprises cryptographic functions for verifying that the attribute updating instructions have been transmitted by the authorized central unit 5 of the security provider. The attribute updating module 108 updates the personal customer attributes 107 based on the received and verified attribute updating instructions; customer attribute values are thereby updated, customer attributes added or deleted.

The key administration module 110 receives, via the above-mentioned interface, key administration instructions, which are received in the communication terminal 2, via the communication network 3, from the central unit 5 of the security provider. The key administration module 110 preferably comprises cryptographic functions for verifying that the key administration instructions have been transmitted by the authorized central unit 5 of the security provider. The key administration module 110 activates, deactivates and updates the stored keys 101, 102, 103, 104 based on the received and verified key administration instructions. Public and private keys 103, 104 of the security provider can thereby be distributed and renewed by the central unit 5 of the security provider, newly generated public and private customer keys 101, 102 activated, and the digital keys for blocked customers deactivated.

The signature module 105 comprises furthermore a certification module 105a with cryptographic functions for generating a digital signature certificate from the customer signature using the private key of the security provider 104. That means that the certification module 105a comprises cryptographic functions in order to generate a digital signature (the certificate signature) from the customer signature, based on an asymmetrical encryption method, and further data (certificate data) to be used for the generation of the signature certificate using the private key 104 of the security provider. The certificate data to be used for the generation of the signature certificate preferably include further certificate data, besides the fingerprint of the customer signature:

the fingerprint, used for the generation of the customer signature, of the object data to be signed, time data on the point in time of generation of the customer signature, the customer identification 106, personal customer attributes 107 as well as their date of updating (possibly including time of day), and time data on the point in time of generation of the signature of the signature certificate (certificate signature).

For generation of the signature certificate from the mentioned certificate data listed above, the certification module 105a first generates a fingerprint (hash) comprising the fingerprint of the customer signature as well as preferably the mentioned further certificate data listed above. Afterwards the certification module 105a generates the certificate signature through encryption, using the private key 104 of the security provider, of the fingerprint generated beforehand. The signature certificate is formed from the certificate signature and the fingerprint used therefor.

In an embodiment variant, the certification module 105a uses the customer signature directly in the certificate data instead of the fingerprint of the customer signature and instead of the fingerprint used for the customer signature. Moreover no fingerprint of the certificate data is formed, but instead the certificate data themselves are encrypted using the private key 104 of the security provider. Afterwards only these encrypted certificate data need to be transmitted to a transaction partner; the customer signature can be obtained at the transaction partner from the encrypted certificate data by means of the public key of the security provider.

In FIG. 1, the reference numeral 4 designates an electronic device comprising a communication terminal 40 and two portable electronic security modules 41 and 42 which are each removably connected to the communication terminal 40 via a contactless interface or an interface having contacts. The communication terminal 40 comprises a communication module for communication over the communication network 3. The communication terminal 40 is implemented, for example, as a mobile radio telephone, laptop or PDA computer or a PC.

The security modules 41 and 42 each comprise at least one processor 11 and an electronic data store 410, or respectively 420, for storing digital data and software programs. The security modules 41 and 42 are implemented preferably as chipcards; the security module 41 is a SIM card, for instance.

Stored in the electronic data store 410 is a digital key pair consisting of the public customer key 101 and the secret private customer key 102. The security module 41 also comprises the functional modules 105 and 109, i.e. the signature module 105 and the time determining module 109 One skilled in the art will understand that the public customer key can also be contained in a public key certificate.

Stored in the electronic data store 420 is a digital key pair consisting of the public key 103 of the security provider and the secret private key 104 of the security provider. Also stored in the data store 420 are the customer identification 106 and the personal customer attributes 107. The security module 42 also comprises the functional modules 108, 109 and 110, i.e. the attribute updating module 108, the time determining module 109 and the key administration module 110.

The security module 42 comprises in addition further functional modules, i.e. the verification module 421, the certification module 422 and the authentication module 423, which are implemented preferably as software modules for controlling the processor 11 and are stored in the data store 420. One skilled in the art will understand that the functional modules 421, 422 and 423 can also be implemented partially or completely through hardware.

The authentication module 423 verifies the authenticity of the customer identification and of the public customer key. The authentication module 423 receives from the security module 41 either the public customer key or the public key certificate of the public customer key. The authentication module 423 checks whether the received public customer key is already present (known) in the security module 42 and is not disabled, or it verifies the received public key certificate of the public customer key by means of the public key of the security provider and checks the customer identification contained therein.

The verification module 421 receives a digital customer signature and the object data used to generate the customer signature (either the object data or the fingerprint used of the object data) from the security module 41. Using the public customer key 101, which is checked by the authentication module 423, the verification module 421 verifies the received customer signature by decrypting it and comparing it with the fingerprint of the object data used for generating the customer signature.

The functionality of the certification module 422 corresponds to that of the certification module 105a. The certification module 422 generates a digital signature certificate from the verified customer signature using the private key 104 of the security provider.

Described in the following paragraphs, with reference to FIG. 2, will be the course of the method using the example of an ordering transaction for the case where the customer signature and the signature certificate are generated in the security module 1 through an inseparable process.

In step S0, optionally, an electronic order form is transmitted from the terminal 6 of a transaction partner, i.e. from the service provider from whom a service, a piece of information or an article is supposed to be ordered, via the communication network 3 to the communication terminal 2 of the customer. The terminal 6 of the transaction partner is, for example, a computer connected to the Internet. The communication between the communication terminal 2 and the terminal 6 takes place, for instance, via WAP (Wireless Application Protocol).

In step S1, the order data (transaction data) are prepared by the customer, for example by filling out an electronic order form, and are transmitted to the security module 1 for electronic signing. Also in step S1, those of the personal attributes 107 which are supposed to be transmitted with the order to the transaction partner are selected by the customer (for instance by means of a programmed selection module).

In step S2, a fingerprint (hash) of the object data to be signed, i.e. of the order data prepared in step S1, is generated in the security module 1.

In step S3, the current time data are determined in the security module 1.

In step S4, the customer signature is generated in the security module 1 by the fingerprint of the order data generated in step S2 being encrypted using the private customer key 102.

Generated in step S5 in the security module 1 is a fingerprint (hash) of the customer signature generated in step S4.

Prepared in step S6 in the security module 1 are (optionally) the above-described further certificate data for generating the signature certificate. In particular, in step S6, a fingerprint (hash) is also generated consisting of the fingerprint (hash) generated in step S5, the customer signature, the fingerprint (hash) generated in step S5 of the order data, the time data determined in step S3, the customer identification 106, the personal customer attributes 107 selected in step S1, and the date of update of the customer attributes.

In step S7, the signature certificate, prepared in step S6, is completed in the security module 1 by the fingerprint (hash) generated in step S6 being encrypted using the private key 104 of the security provider, whereby the content of the signature certificate is digitally signed. The signature certificate comprises the certificate signature and the fingerprint of the certificate data necessary therefor.

In step S8, the order data prepared in step S1, the customer signature generated in step S4, and the signature certificate generated in steps S6 and S7 are transmitted by the communication terminal 2 via the communication network 3 to the terminal of the transaction partner 6.

In step S9, the signature certificate received in step S8 is verified in the terminal of the transaction partner 6 by its being decrypted using the public key of the security provider, the fingerprint of the order data being compared with the order data, and the time data regarding the point in time of the customer signature being checked. On the basis of the verified signature certificate, it can be determined in the terminal of the transaction partner 6 that the respective customer is known at the security provider, whether the customer is authorized for the transaction and credit worthy based on the co-delivered customer attributes, until which date of update the customer attributes have been updated, and that the customer signature is verifiable if need be. On the basis of this information it is possible, as a rule, for the transaction partner to initiate the delivery according to the order data without further clarifications.

Steps S1 to S7 for generation of the customer signature and of the signature certificate can be made to depend upon the condition that the customer enters a secret code (Personal Identification Number or password) into the communication terminal 2.

Described in the following paragraphs, with reference to FIG. 3, will be the course of the method using the example of an ordering transaction for the case where the customer signature and the signature certificate are generated in the security module 41 and the security module 42 through separate processes.

In steps S0 to S4, in the security module 41, the customer signature is generated from the order data prepared by the customer by a fingerprint of the order data being encrypted using the private customer key 102, as described above.

In step S10, the customer signature generated in step S4 as well as the public customer key, or respectively the corresponding public key certificate, are transferred to the security module 42 together with the order data prepared in step S1 and the current time data determined in step S3. The selection of the customer attributes is preferably not carried out until a later step. The current time data can also be determined for the first time in the security module 42.

Determined in the authentication module 423 in step S11 is the authenticity of the customer identification and the public customer key (with or without public key certificate) received in step S10. If no authentication can be achieved, the ordering process is discontinued. Otherwise, the customer signature received in step S10 is verified in the security module 42 by the customer signature being decrypted using the public customer key and the decrypted data being compared with a fingerprint (hash) of the order data received in step S10. If the customer signature cannot be verified, no signature certificate is generated. If the customer signature is positively verified, those of the personal customer attributes 107 are also selected by the customer in step S11 which are supposed to be transmitted to the transaction partner with the order, and the method is continued in step S5.

In steps S5 to S7, in the security module 42, the signature certificate is generated from the verified customer signature, as described above.

In step S8, the order data prepared in step S1, the customer signature generated in step S4 and the signature certificate generated in step S7 are transmitted by the communication terminal 40 over the communication network 3 to the terminal of the transaction partner 6, and the received signature certificate is verified there in step S9 as described above.

In conclusion, it should be stated that use of the security modules 1, 41, and 42 is not limited to use with communication terminals 2, 40, but instead that they are usable in networked as well as in non-networked electronic devices, for instance in electronic sound and image-recording devices for signing sound or respectively image data, as well as in network gateways and proxies.

LIST OF REFERENCE NUMERALS

1 portable electronic security module (electronic device)
2 communication terminal
3 communication network
4 electronic device
5 central unit of a security provider
6 terminal of a transaction partner
10 data store
11 processor
40 communication terminal
41, 42 security module
51 key administration functions
52 key disabling functions
53 attribute administration functions
54 archive functions for public key certificate
55 verification functions
101 public customer key
102 secret private customer key
103 public key of the security provider
104 secret private key of the security provider
105 signature module
105*a* certification module
106 customer identification
107 personal customer attributes
108 attribute updating module
109 time determination module
110 key administration module
410 data store
420 data store
421 verification module
422 certification module
423 authentication module
S0 transmission of an order form
S1 preparation of order data
S2 generation of a fingerprint of the order data
S3 determination of time data
S4 generation of the customer signature
S5 generation of the fingerprint of the customer signature
S6 preparation of further data for the signature certificate S7 generation of the signature certificate
S8 transmission of the order data, of the customer signature and of the signature certificate
S9 decryption of the signature certificate
S10 transfer of the customer signature and of the fingerprint of the order data
S11 verification of the customer signature

The invention claimed is:

1. A portable, electronic security module, comprising:
an electronic data storage device,
a secret private customer key and a public customer key stored in the electronic data storage device as a first digital key pair,
a signature module configured to generate a digital customer signature from object data to be signed using the secret private customer key,
a secret private key of a security provider and a public key of the security provider stored in the electronic data storage device as a second digital key pair, and
a certification module, installed in the signature module, and configured to generate a digital signature certificate from the digital customer signature using the secret private key of the security provider.

2. The electronic security module according to claim 1, further comprising a customer identification stored in the electronic data storage device, wherein the certification module is configured to generate the signature certificate using additionally the customer identification.

3. The electronic security module according to claim 1, further comprising personal customer attributes stored in the electronic data storage device, wherein the certification module is configured to generate the signature certificate using additionally the customer attributes.

4. The electronic security module according to claim 3, further comprising an attribute updating module configured to receive attribute updating instructions and to update the customer attributes based on received attribute updating instructions.

5. The electronic security module according to claim 1, further comprising a time determining module configured to determine current time data, wherein the certification module is configured to generate the signature certificate using additionally the determined time data.

6. The electronic security module according to claim 1, wherein the signature module is configured to generate the digital customer signature from a first fingerprint of the object data to be signed, and wherein the certification module is configured to generate the signature certificate using additionally the first fingerprint, when generating the signature certificate the certification module generates a second fingerprint from the data to be used for the generation of the signature certificate, the certification module generates a digital certificate signature from the generated second fingerprint using the secret private key of the security provider, and the certification module forms the signature certificate from the generated certificate signature and from the generated second fingerprint.

7. The electronic security module according to claim 1, further comprising a key administration module configured to receive key administration instructions and to activate, deactivate, and update the keys stored in the electronic data storage device based on received key administration instructions.

8. The electronic security module according to claim 1, wherein the electronic security module is a SIM card.

9. An electronic device, comprising:
a first electronic security module including a first electronic data storage device,
a secret private customer key and a public customer key stored in the first electronic data storage device as a first digital key pair,
a signature module, installed in the first security module, and configured to generate, using the private customer key, a digital customer signature from object data to be signed,
a second electronic security module including a second electronic data storage device,
a second digital key pair, stored in the second electronic data storage device, and including a public key of a security provider and a secret private key of the security provider,
an authentication module, installed in the second security module, and configured to authenticate the public customer key,
a verification module, installed in the second security module, and configured to receive the customer signature, to receive the object data configured to generate the customer signature, and to verify the customer signature using the authenticated public customer key and the received object data configured to generate the customer signature, and
a certification module, installed in the second security module, and configured to generate a digital signature certificate from the verified customer signature using the private key of the security provider.

10. The electronic device according to claim 9, wherein the second security module comprises a customer identification stored in the second electronic data storage device, and the certification module is configured to generate the signature certificate using additionally the customer identification.

11. The electronic device according to claim 9, wherein the second security module comprises personal customer attributes stored in the second electronic data storage device, and the certification module is configured to generate the signature certificate using additionally the customer attributes.

12. The electronic device according to claim 11, wherein the second security module comprises an attribute updating module configured to receive attribute updating instructions and to update the customer attributes based on received attribute updating instructions.

13. The electronic device according to claim 9, further comprising a time determining module configured to determine current time data, wherein the certification module is configured to generate the signature certificate using additionally the determined time data.

14. The electronic device according to claim 9, wherein the signature module is configured to generate the digital customer signature from a first fingerprint of the object data to be signed, and wherein the certification module is configured to generate the signature certificate using additionally the first fingerprint, when generating the signature certificate the certification module generates a second fingerprint from the data configured to generate the signature certificate, the certification module generates a digital certificate signature from the generated second fingerprint using the secret private key of the security provider, and the certification module forms the signature certificate from the generated certificate signature and from the generated second fingerprint.

15. The electronic device according to claim 9, wherein the second security module comprises a key administration module configured to receive key administration instructions and to activate, deactivate, and update the keys stored in the electronic device based on received key administration instructions.

16. The electronic device according to claim 9, wherein at least one of the two security modules is a portable module configured to be connected to the electronic device.

17. A cryptographic security method, comprising the steps of:
  storing a secret private customer key and a public customer key as a first digital key pair in an electronic device,
  generating in the electronic device, using the private customer key, a digital customer signature from object data to be signed,
  storing a secret private key of a security provider and a public key of the security provider as a second digital key pair in the electronic device, and
  generating in the electronic device a digital signature certificate from the customer signature using the private key of the security provider.

18. The security method according to claim 17, wherein the public customer key is authenticated in the electronic device before generation of the digital signature certificate, and the customer signature is verified using the authenticated public customer key and the object data configured to generate the customer signature.

19. The security method according to claim 17, wherein a customer identification is stored in the electronic device, and the signature certificate is generated using additionally the customer identification.

20. The security method according to claim 17, wherein personal customer attributes are stored in the electronic device, and the signature certificate is generated using additionally the customer attributes.

21. The security method according to claim 20, wherein attribute updating instructions are received in the electronic device, and the customer attributes are updated based on received attribute updating instructions.

22. The security method according to claim 17, wherein current time data is determined in the electronic device, and the signature certificate is generated using additionally the determined time data.

23. The security method according to claim 17, wherein the digital customer signature is generated from a first fingerprint of the object data to be signed, the signature certificate is generated using additionally the first fingerprint, when generating the signature certificate a second fingerprint is generated from the data configured to generate the signature certificate, a digital certificate signature is generated from the generated second fingerprint using the secret private key of the security provider, and the signature certificate is formed from the generated certificate signature and from the generated second fingerprint.

24. The security method according to claim 17, wherein key administration instructions are received in the electronic device, and the keys stored in the electronic device are activated, deactivated or updated based on received key administration instructions.

* * * * *